United States Patent
Park et al.

(10) Patent No.: US 12,250,480 B2
(45) Date of Patent: Mar. 11, 2025

(54) IMAGE ADJUSTMENT APPARATUS AND IMAGE SENSOR FOR SYNCHRONOUS IMAGE AND ASYNCHRONOUS IMAGE

(71) Applicant: SAMSUNG ELECTRONICS CO., LTD., Suwon-si (KR)

(72) Inventors: Keun Joo Park, Seoul (KR); Hyun Surk Ryu, Hwaseong-si (KR); Tae Chan Kim, Yongin-si (KR); Jun Haeng Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/499,886

(22) Filed: Nov. 1, 2023

(65) Prior Publication Data

US 2024/0064429 A1 Feb. 22, 2024

Related U.S. Application Data

(63) Continuation of application No. 18/185,173, filed on Mar. 16, 2023, now Pat. No. 11,863,894, which is a continuation of application No. 17/554,826, filed on Dec. 17, 2021, now Pat. No. 11,627,271, which is a continuation of application No. 16/859,598, filed on Apr. 27, 2020, now Pat. No. 11,233,964, which is a continuation of application No. 16/279,565, filed on
(Continued)

(30) Foreign Application Priority Data

Jun. 17, 2013 (KR) .................. 10-2013-0068855

(51) Int. Cl.
*H04N 25/71* (2023.01)
*H04N 23/45* (2023.01)

(52) U.S. Cl.
CPC ........... *H04N 25/745* (2023.01); *H04N 23/45* (2023.01)

(58) Field of Classification Search
CPC .... H04N 25/745; H04N 23/45; H04N 25/707; H04N 25/7795
See application file for complete search history.

(56) References Cited

U.S. PATENT DOCUMENTS 6,253,161 B1 6/2001 Arias-Estrada
6,831,634 B1 12/2004 Shigeta
(Continued)

FOREIGN PATENT DOCUMENTS

EP 0 802 426 B1 11/2001
EP 0 943 211 B1 8/2008
(Continued)

OTHER PUBLICATIONS

Communication issued Aug. 7, 2019, issued by the Korean Intellectual Property Office in counterpart Korean Patent Application No. 10-2013-0068855.
(Continued)

*Primary Examiner* — Gevell V Selby
(74) *Attorney, Agent, or Firm* — Sughrue Mion, PLLC

(57) ABSTRACT

An image adjustment apparatus includes a receiver which is configured to receive a first input image of an object which is time-synchronously captured and a second input image in which a motion event of the object is sensed time-asynchronously, and an adjuster which is configured to adjust the first input image and the second input image.

18 Claims, 11 Drawing Sheets

Related U.S. Application Data

Feb. 19, 2019, now Pat. No. 10,674,104, which is a continuation of application No. 14/299,599, filed on Jun. 9, 2014, now Pat. No. 10,237,506.

(56) References Cited

U.S. PATENT DOCUMENTS

| | | |
|---|---|---|
| 7,542,090 B1 | 6/2009 | Merchant |
| 8,698,092 B2 | 4/2014 | Lee et al. |
| 8,860,930 B2 | 10/2014 | Kirby |
| 9,001,220 B2 | 4/2015 | Kim et al. |
| 9,538,152 B2 | 1/2017 | Shabtay et al. |
| 9,582,840 B2 | 2/2017 | Lee et al. |
| 9,621,749 B2 | 4/2017 | Jung et al. |
| 11,233,964 B2 | 1/2022 | Park et al. |
| 2003/0202701 A1 | 10/2003 | Schuler |
| 2006/0056056 A1 | 3/2006 | Ahiska et al. |
| 2006/0146152 A1 | 7/2006 | Jo et al. |
| 2006/0221250 A1 | 10/2006 | Rossbach et al. |
| 2006/0279628 A1 | 12/2006 | Fleming |
| 2007/0109433 A1 | 5/2007 | Yamada et al. |
| 2007/0133068 A1 | 6/2007 | Yu |
| 2008/0030592 A1 | 2/2008 | Border et al. |
| 2008/0211941 A1 | 9/2008 | Deever et al. |
| 2010/0182468 A1 | 7/2010 | Posch et al. |
| 2011/0150101 A1 | 6/2011 | Liu et al. |
| 2012/0087571 A1 | 4/2012 | Lee et al. |
| 2012/0257789 A1* | 10/2012 | Lee .................. G06F 3/017 |
| | | 382/103 |
| 2013/0201360 A1 | 8/2013 | Song |
| 2013/0329063 A1 | 12/2013 | Zhou |
| 2014/0009648 A1 | 1/2014 | Kim et al. |
| 2014/0009650 A1 | 1/2014 | Kim et al. |
| 2015/0116564 A1 | 4/2015 | Williams |
| 2015/0365617 A1 | 12/2015 | Chen |

FOREIGN PATENT DOCUMENTS

| | | |
|---|---|---|
| JP | 2006-279897 A | 10/2006 |
| JP | 2008-507229 A | 3/2008 |
| JP | 2010-016659 A | 1/2010 |
| JP | 2012-74893 A | 4/2012 |
| KR | 10-2006-0112719 A | 11/2006 |
| KR | 10-2008-0073073 A | 8/2008 |
| KR | 10-2010-0095002 A | 8/2010 |
| KR | 10-2012-0096954 A | 8/2012 |
| KR | 10-2012-0113847 A | 10/2012 |

OTHER PUBLICATIONS

Jae-Yong Ju et al; Multi-sensor Image Registration Using Normalized Mutual Information and Gradient Orientation; Journal of the Korea Society of Computer and Information; vol. 17; No. 6, Jun. 2012; pp. 37-48.

Wan-Soo Shin et al; "Real-time Disparity Acquisition Algorithm from Stereoscopic Image and its Hardware Implementation"; Nov. 2009; vol. 34; No. 11; pp. 1029-1039.

* cited by examiner

IMAGE ADJUSTMENT APPARATUS AND IMAGE SENSOR FOR SYNCHRONOUS IMAGE AND ASYNCHRONOUS IMAGE

CROSS-REFERENCE TO RELATED APPLICATIONS

This application is a Continuation application of U.S. Ser. No. 18/185,173, filed Mar. 16, 2023, which is a Continuation application of U.S. application Ser. No. 17/554,826, filed Dec. 17, 2021, now U.S. Pat. No. 11,627,271, which is a Continuation application of U.S. application Ser. No. 16/859,598, filed Apr. 27, 2020, now U.S. Pat. No. 11,233,964, which is a Continuation application of U.S. application Ser. No. 16/279,565 filed on Feb. 19, 2019, now U.S. Pat. No. 10,674,104, which is a Continuation application of U.S. application Ser. No. 14/299,599 filed on Jun. 9, 2014, now U.S. Pat. No. 10,237,506, which claims priority from Korean Patent Application No. 10-2013-0068855, filed on Jun. 17, 2013, in the Korean Intellectual Property Office, the disclosures of which are incorporated by reference herein in their entireties.

BACKGROUND

1. Field

Exemplary embodiments relate to an image adjustment apparatus and an image sensor. In particular, exemplary embodiments relate to a technology for adjusting an image and a technology for sensing an image.

2. Description of Related Art

A related art complementary metal-oxide semiconductor (CMOS) image sensor has been widely used in various devices, for example, smartphones and camcorders. A related art image sensor may be used for capturing an image or a video, and for providing a user interface for an input object recognition and providing an application service such as a video call.

The related art CMOS image sensor adopts a frame-based synchronous sensing structure. For example, the related art CMOS image sensor may provide a signal having a predetermined period to a horizontal scanner or a vertical scanner so that image information of each pixel may be readout and reset. The predetermined period may be referred to as a frame.

SUMMARY

According to an aspect of an exemplary embodiment, there is provided an image adjustment apparatus including a receiver which is configured to receive a first input image of an object which is time-synchronously captured and a second input image in which a motion event of the object is sensed time-asynchronously and an adjuster which is configured to adjust the first input image and the second input image.

The adjuster may include a time adjuster which is configured to match an event timing in the second input image with one of a plurality of frame periods of the first input image such that time information of the first input image and time information of the second input image is adjusted.

The adjuster may also include a space adjuster which is configured to adjust space information of the first input image and space information of the second input image based on a difference between a resolution of the first input image and a resolution of the second input image.

According to an aspect of an exemplary embodiment, there is provided an apparatus for image sensing including a first image sensor which is configured to time-synchronously capture an object, and a second image sensor configured to time-asynchronously sense a motion event of the object.

The apparatus may further include a beam splitter which is configured to evenly split a plurality of beams input through a lens such that the evenly split beams are input to the first image sensor and the second image sensor, the first image sensor and the second image sensor are separated by a space.

According to another aspect of an exemplary embodiment, there is also provided an image sensor including a plurality of first image pixels which are configured to time-synchronously capture an object, and at least one second image pixel which is configured to time-asynchronously sense a motion event of the object. The at least one second image pixel may be arranged adjacent to at least one corresponding first image pixel among the plurality of first image pixels.

According to another aspect of an exemplary embodiment, there is also provided an image processing method including acquiring a clock signal, acquiring event data asynchronously occurring in the clock signal, acquiring pixel data synchronously occurring in the clock signal based on a predetermined number of frames per second; and adjusting the event data and the pixel data based on the clock signal.

According to another aspect of an exemplary embodiment, there is also provided an image adjustment method including acquiring a clock signal, acquiring event data which occurs asynchronously in the clock signal, acquiring pixel data which occurs synchronously in the clock signal, and adjusting the event data and the pixel data based on the acquired event data and the acquired pixel data.

Other features and aspects will be apparent from the following detailed description, the drawings, and the claims.

DETAILED DESCRIPTION OF THE EXEMPLARY EMBODIMENTS

Figure 1:
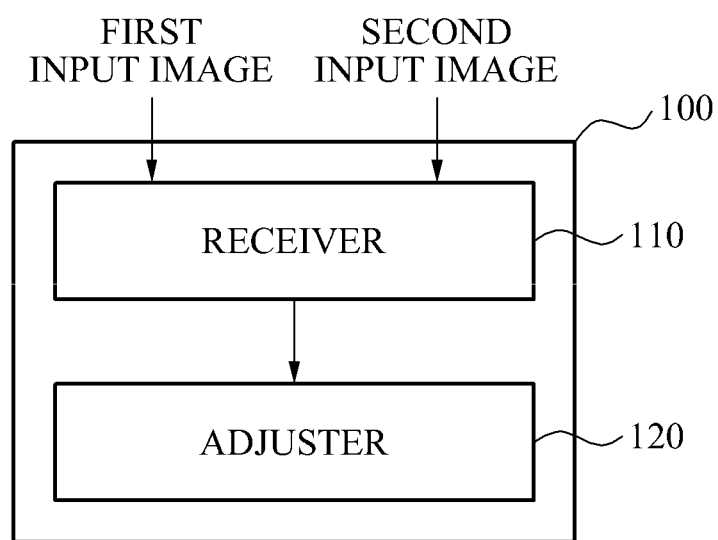
FIG. 1 is a block diagram illustrating an example of an image adjustment apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example. However, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a block diagram illustrating an example of an image adjustment apparatus 100.

Referring to FIG. 1, the image adjustment apparatus 100 includes a receiver 110 and an adjuster 120.

The receiver 110 may receive a first input image of an object which is captured time-synchronously, and a second input image in which a motion event of the object is sensed time-asynchronously.

For example, the first input image may be output from an image sensor which captures the object based on a predetermined number of frames per second. Further, the second input image may be output from a dynamic vision sensor which captures the object.

The dynamic vision sensor may asynchronously output event data in response to sensing a predetermined event. The predetermined event may include a change in brightness of entering beams.

Hereinafter, for descriptive convenience, the image sensor which outputs the first input image is referred to as a frame-based image sensor, and the dynamic vision sensor is referred to as an event-based image sensor.

When the event-based sensor senses an event in which brightness of beams increases in a predetermined pixel, the event-based image sensor may output an ON event corresponding to the predetermined pixel. Further, when the event-based sensor senses an event in which brightness of beams decreases in a predetermined pixel, the event-based sensor may output an OFF event corresponding to the predetermined pixel.

The event-based image sensor may not scan an output of a photodiode of each pixel on a frame-by-frame basis. Further, the event-based image sensor may output pixel data of a portion in which brightness of beams changes (in contrast to the frame-based image sensor).

A change in brightness of input beams may be based on a motion of an object. For example, a source of beams may be fixed over time.

In this example, beams reflected by a stationary object may not be changed. Thus, brightness of beams entering the event-based image sensor may not be changed. In contrast, when an object moves, beams reflected by the moving object may be changed based on a motion of the object. Thus, brightness of beams entering the event-based image sensor may be changed.

Since the event-based image sensor outputs event data in response to sensing a predetermined event, the event-based image sensor may output time-asynchronous event data.

The frame-based image sensor may synchronously output pixel data based on a predetermined number of frames per second. For example, the frame-based image sensor may output the pixel data based on a setting, such as 30 frames per second or 60 frames per second.

The frame-based image sensor may output time-synchronous pixel data. For example, the frame-based image sensor may be synchronized with a global clock, and use a frame synchronization signal satisfying the predetermined number of frames per second. The frame-based image sensor may output pixel data of a corresponding frame in each time interval at which the frame synchronization signal indicates "ON".

The adjuster 120 may adjust the first input image and the second input image. Hereinafter, for descriptive convenience, the first input image is referred to as pixel data and the second input image is referred to as event data.

Adjustment of event data and pixel data may comprehensively include an operation of matching information included in the event data and information included in the pixel data, an operation of generating, maintaining, and managing matching information, an operation of processing at least one of the event data and the pixel data using the matching information, an operation of processing the pixel data based on the information included in the event data, an operation of processing the event data based on the information included in the pixel data, etc.

The event-based image sensor may have a high reaction rate or a high response rate, and process a relatively small amount of data. The frame-based image sensor may provide high-resolution image data, and provide image data of a moving object and a stationary object. A response rate of the event-based image sensor may be measured in units less than or equal to microseconds (μs).

The image adjustment apparatus 100 may utilize a characteristic of the event-based image sensor and a characteristic of the frame-based image sensor.

For example, the image adjustment apparatus 100 may process the event data output from the event-based image sensor having a high response rate, and process the pixel data spatially and temporally adjusted by the frame-based image sensor. Thus, the image adjustment apparatus 100 may make full use of the event data and the pixel data output from the event-based image sensor and the frame-based image sensor.

The image adjustment apparatus 100 may provide a result of the adjustment to an image processing apparatus. Thus, the image adjustment apparatus 100 may recognize an object, a character, a face, and a motion of an object. Further, the image processing apparatus may provide various user interfaces and application services by processing an image output from the image adjustment apparatus 100.

An operation of spatially and temporally adjusting output data of the event-based image sensor and output data of the frame-based image sensor by the adjuster 120 will be further described with reference to FIGS. 3A through 4.

The event data output by the event-based image sensor may include at least one of an event timing at which a predetermined event is sensed, a pixel index in which the predetermined event is sensed, and an indicator to indicate a type of the predetermined event. Alternatively, the event data may include at least one of information associated with a time at which an event is sensed and information associated with an address at which a corresponding event is sensed.

For example, the event data may include timing information indicating a time at which an event is sensed based on a global clock. The event data may also include indexing information indicating a location of a pixel in which the event is sensed. The event data may also include information indicating a type of the sensed event among predetermined events.

Although not shown in the drawings, the image adjustment apparatus 100 may further include a processing unit. In an exemplary embodiment, the processing unit may comprise at least one of a processor, a circuit, or a hardware module.

In response to receipt of the event data, the processing unit may selectively process the pixel data corresponding to at least one of the event timing and the pixel index included in the event data.

For example, the event data may include information associated with a timing at which the predetermined event occurs and a location of the pixel in which the corresponding event occurs. The processing unit may select the pixel data corresponding to the event timing and the pixel index included in the event data.

The processing unit may process the pixel data selected from among pixel data output for each frame period. Thus, the processing unit may reduce an amount of data to be processed for performing a predetermined operation.

Figure 2:
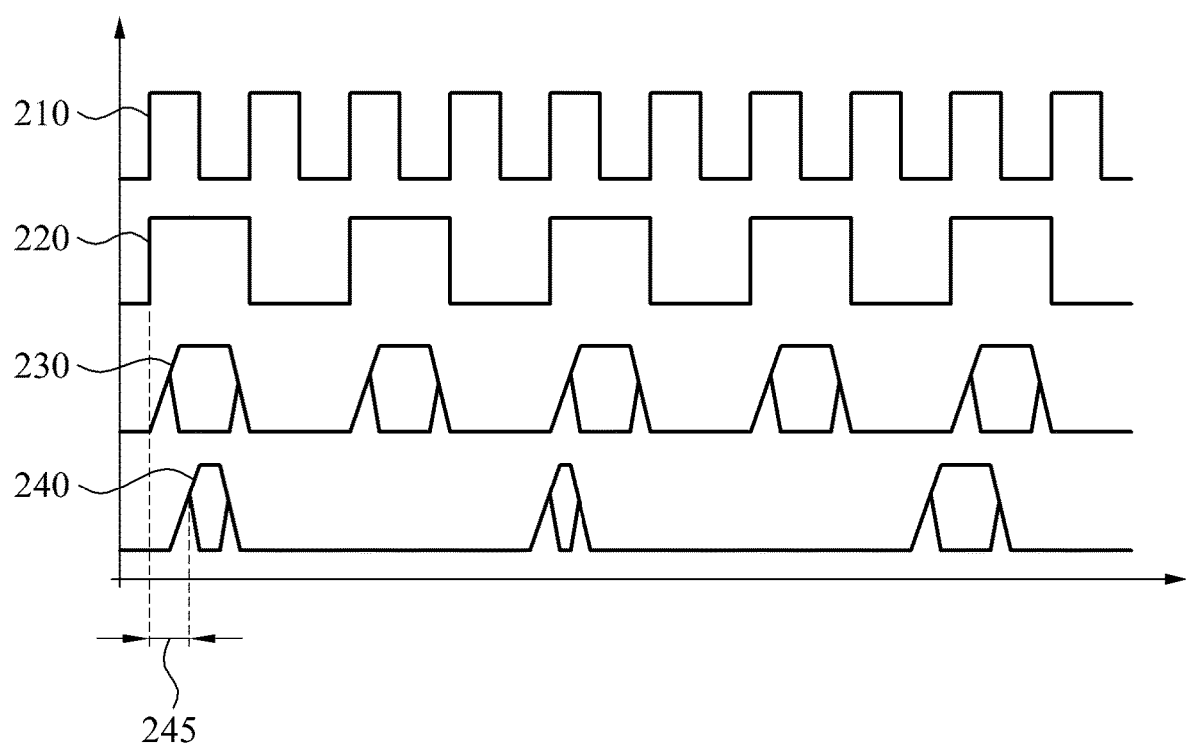
FIG. 2 is a diagram illustrating an example of timing at which event data and pixel data is output.

FIG. 2 is a diagram illustrating an example of timing at which event data and pixel data is output.

Referring to FIG. 2, a frame-based image sensor may output pixel data 230 using a frame synchronization signal 220 synchronized with a clock signal 210.

The frame synchronization signal 220 may be synchronized with the clock signal 210 using a method of matching a rising edge of the frame synchronization signal 220 and a rising edge of the clock signal 210. Also, an ON/OFF period of the frame synchronization signal 220 may be determined based on a predetermined number of frames per second of the frame-based image sensor.

The frame-based image sensor may output the pixel data 230 of a corresponding frame in each time interval at which the frame synchronization signal 220 indicates an "ON" state. The frame-based image sensor may output the pixel data 230 of a corresponding frame in response to the rising edge of the frame synchronization signal 220.

An event-based image sensor may output event data 240 asynchronous to the clock signal 210. For example, the event-based image sensor may sense a predetermined event and output the event data 240. Thus, a time interval 245 between a predetermined rising edge time point of the clock signal 210 and a time point at which the event data 240 is output may not be uniform. In other words, the event data 240 is not synchronized with the clock signal 210.

Hereinafter, a method of matching the pixel data 230 synchronous to the clock signal 210 and the event data 240 asynchronous to the clock signal 210 will be further described with reference to FIGS. 3A through 3C.

Figure 3A:
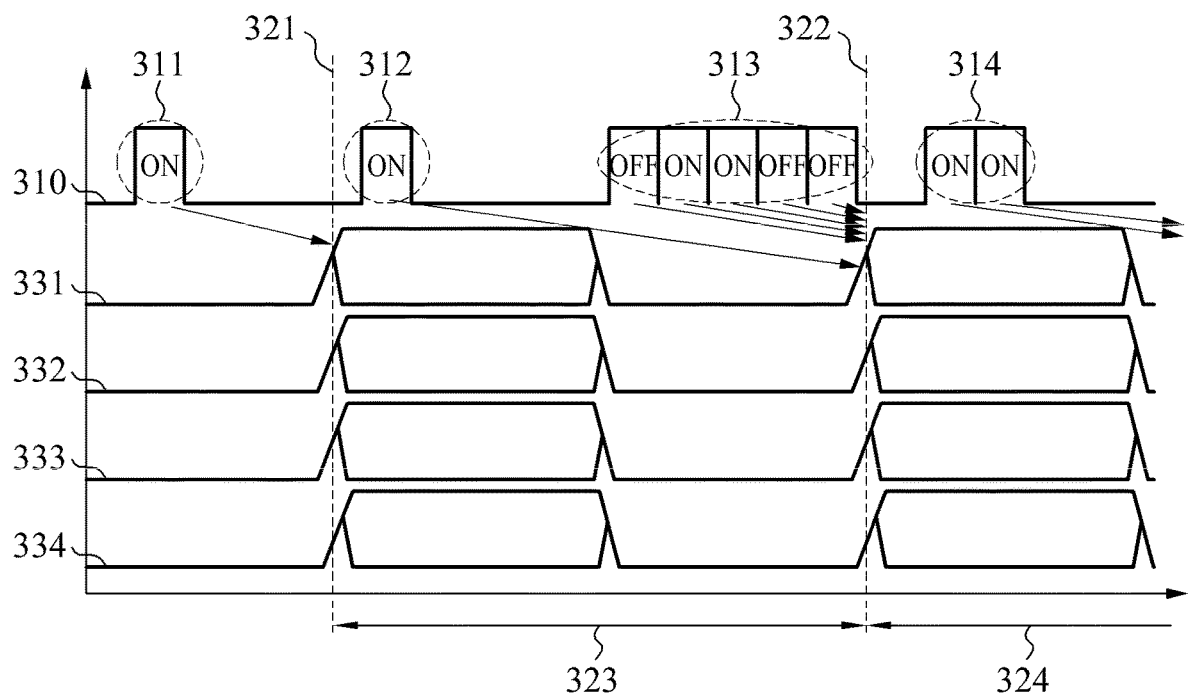
FIGS. 3A through 3C are diagrams illustrating examples of a method of temporally adjusting event data and pixel data.
Figure 3B:
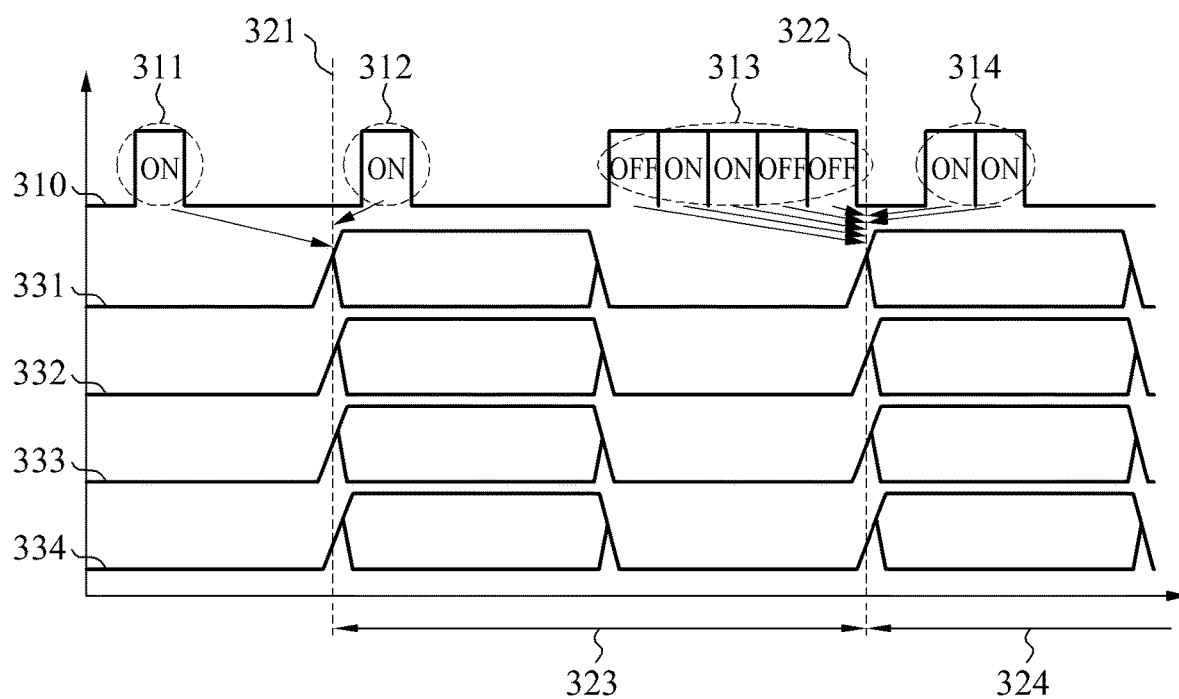
Figure 3C:
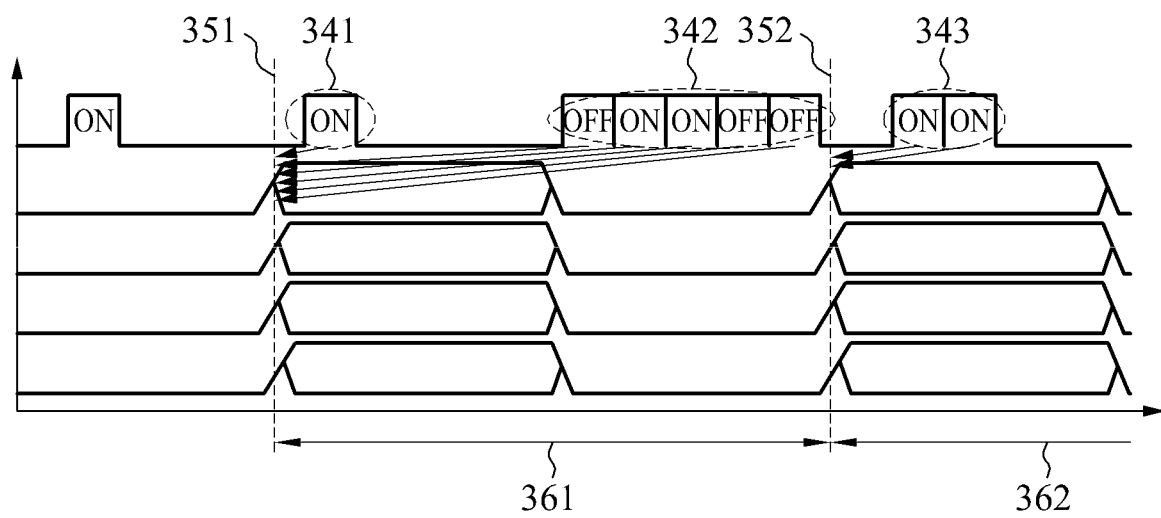

FIGS. 3A to 3C are diagrams illustrating examples of a method of temporally adjusting event data and pixel data.

Referring to FIG. 3A, an event-based image sensor according to an example embodiment may output asynchronous event data 310, and a frame-based image sensor may output synchronous pixel data 331, 332, 333, and 334.

The frame-based image sensor may output the pixel data 331, 332, 333, and 334 in response to frame synchronization timings 321 and 322. Each of the frame synchronization timings 321 and 322 may include the rising edge of the frame synchronization signal 220 of FIG. 2.

An image adjustment apparatus according to an example embodiment may adjust a single piece of the event data 310 to the pixel data 331, 331, 333, and 334.

The image processing apparatus according to an example embodiment may match an event timing at which the event data 310 is output to one of a plurality of frame periods for the pixel data 331, 332, 333, and 334.

The image processing apparatus may match the event timing to the frame period using a variety of methods.

For example, the image processing apparatus may match an event timing at which predetermined event data occurs to a subsequent frame period.

In particular, the image processing apparatus may match a first event timing of first event data 311 to a first frame period 323 corresponding to a first frame synchronization timing 321. The first frame synchronization timing is an immediately subsequent (e.g., next) frame synchronization timing. The image processing apparatus may adjust the first event data 311 to pixel data output in the first frame period 323.

The image processing apparatus may process second event data 312 and a set of third event data 313 using an identical method. The image processing apparatus may adjust the second event data 312 and the set of third event data 313 to pixel data of a second frame period 324 corresponding to a second frame synchronization timing 322.

The image processing apparatus may process a set of fourth event data 314 using an identical method. The image processing apparatus may adjust the set of fourth event data 314 to pixel data of a frame period (not shown) corresponding to a subsequent frame synchronization timing (not shown).

Referring to FIG. 3B, the image processing apparatus according to an example embodiment may match an event timing at which a predetermined event data occurs to a frame period corresponding to a closest frame synchronization timing.

For example, the image processing apparatus may match the first event timing of the first event data 311 to the first frame period 323 corresponding to the first frame synchronization timing 321 closest to the first event timing among the plurality of frame synchronization timings. The image processing apparatus may adjust the first event data 311 to the pixel data output in the first frame period 323.

The image processing apparatus may process the second event data 312 using an identical method. Since the second event timing at which the second event data 312 is output is closest to the first synchronization timing 321 among the plurality of frame synchronization timings, the image processing apparatus may adjust the second event data 312 to the pixel data of the first frame period 323 corresponding to the first synchronization timing 321.

The image processing apparatus may process the set of third event data 313 and the set of fourth event data 314 using an identical method. A set of third event timings and a set of fourth event timings, at which the set of third event data 313 and the set of fourth event data 314 are respectively output, may be most adjacent to the second frame synchronization timing 322. Accordingly, the image processing apparatus may adjust the set of third event data 313 and the set of fourth event data 314 to the pixel data of the second frame period 324 corresponding to the second frame synchronization timing 322.

Referring to FIG. 3C, the image processing apparatus according to an example embodiment may match an event timing included in a time interval corresponding to a predetermined frame period to the predetermined frame period.

For example, the image processing apparatus may match fifth event data 341 and a set of sixth event data 342 included in a third frame period 361 corresponding to a third frame synchronization timing 351 to the third frame period 361. The image processing apparatus may adjust the fifth event data 341 and the set of sixth event data 342 to pixel data output in the third frame period 361.

The image processing apparatus may match a set of seventh event data 343 included in a fourth frame period 362 corresponding to a fourth frame synchronization timing 352 to the fourth frame period 362. The image processing apparatus may adjust the set of seventh event data 343 to pixel data output in the fourth frame period 362.

Although not shown in the drawings, an event-based image sensor according to an example embodiment may digitize a timing at which a predetermined event occurs, based on a global clock. For example, when the predetermined event occurs, the event-based image sensor may acquire a time at which the corresponding event occurs using the global clock, and output an event signal including time information.

The image processing apparatus may determine a frame synchronization timing most adjacent to the corresponding timing or a frame period including the corresponding timing using the digitized timing included in event data.

Figure 4:
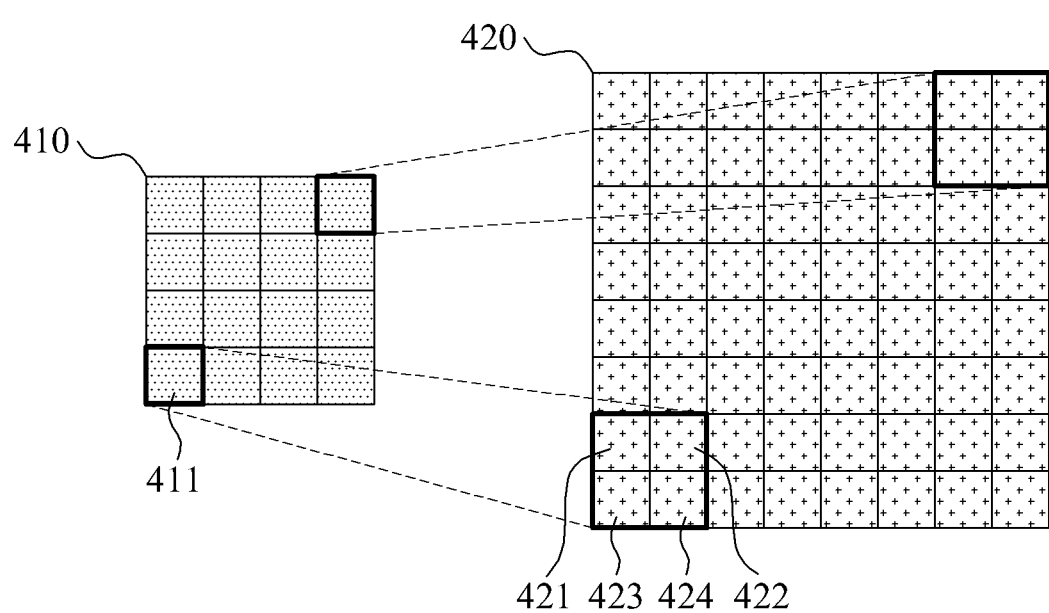
FIG. 4 is a diagram illustrating an example of a method of spatially adjusting event data and pixel data.

FIG. 4 is a diagram illustrating an example of a method of spatially adjusting event data and pixel data.

Referring to FIG. 4, an event-based image sensor and a frame-based image sensor according to an example embodiment may support different resolutions.

For example, to represent an identical area of an object, the event-based image sensor may use an n_1×n_2-sized pixel matrix 410, and the frame-based image sensor may use an m_1×m_2-sized pixel matrix 420.

When the event-based image sensor and the frame-based image sensor have different resolutions, pixels of the event-based image sensor may not be matched to pixels of the frame-based image sensor, respectively.

An image adjustment apparatus according to an example embodiment may adjust event data and pixel data based on a difference between a resolution of the event-based image sensor and a resolution of the frame-based image sensor.

Hereinafter, for descriptive convenience, the resolution of the event-based image sensor may be lower than the resolution of the frame-based image sensor.

The image processing apparatus according to an example embodiment may map (m_1/n_1)×(m_2/n_2) pixels of the frame-based image sensor and a single pixel of the event-based image sensor.

For example, when each of n_1 and n_2 is "4" and each of m_1 and m_2 is "8", the image processing apparatus may map a single pixel of the event-based image sensor to four pixels (i.e., 2×2) of the frame-based image sensor.

The image processing apparatus may also perform mapping such that a relative location of a pixel 411 included in the pixel matrix 410 may correspond to a relative location of a plurality of pixels 421, 422, 423, and 424 included in the pixel matrix 420.

For example, the image processing apparatus may map the pixel 411 of the event-based image sensor to the plurality of pixels 421, 422, 423, and 424 of the frame-based image sensor. Therefore, the image processing apparatus may spatially adjust the event data and the pixel data.

Figure 5:
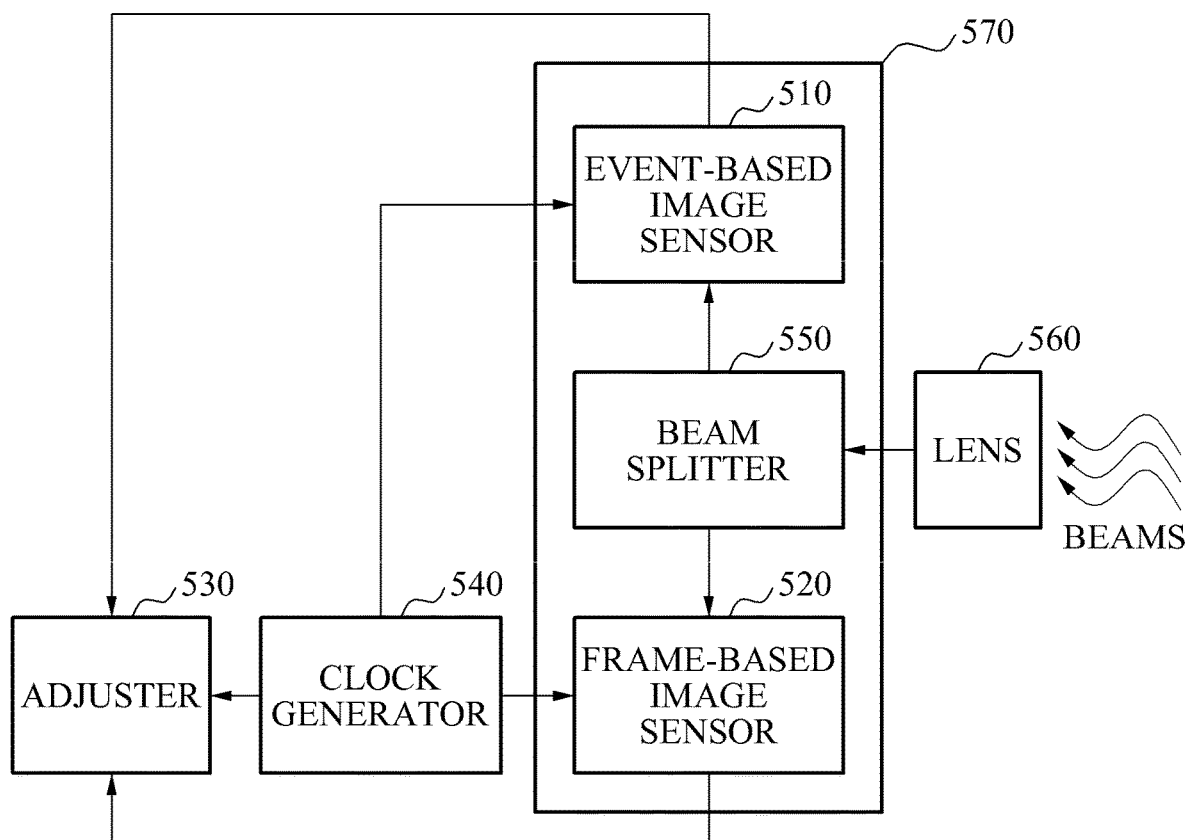
FIG. 5 is a diagram illustrating an example of an image sensing apparatus for providing beams to an event-based image sensor and a frame-based image sensor using a beam splitter.

FIG. 5 is a diagram illustrating an example of an image sensing apparatus 570 for providing beams to an event-based image sensor and a frame-based image sensor using a beam splitter.

Referring to FIG. 5, the image sensing apparatus 570 includes an event-based image sensor 510 and a frame-based image sensor 520.

In the image sensing apparatus 570, the event-based image sensor 510 and the frame-based image sensor 520 may be spatially separated by a space. The image sensing apparatus 570 further includes a beam splitter 550 to optically align an input of the event-based image sensor 510 and an input of the frame-based image sensor 520.

For example, the beam splitter 550 may evenly split beams input through a lens 560 such that the same amount of beams may be input to the event-based image sensor 510 and the frame-based image sensor 520. The beam splitter 550 may provide the evenly split beams to the event-based image sensor 510 and the frame-based image sensor 520, simultaneously. In this exemplary embodiment, the lens 560 is a single object lens used to provide a single image scene, and the beam splitter 550 may be used to separate the single image scene.

Each of the event-based image sensor 510 and the frame-based image sensor 520 may be optically aligned by the beam splitter 550 to receive an identical input corresponding to an identical field of view at an identical point in time.

The image sensing apparatus 570 may include the event-based image sensor 510 and the frame-based image sensor 520 packaged independently. An image adjustment apparatus may input a single image scene captured at the identical field of view in a space into two image sensor packages using the bean splitter 550.

The image sensing apparatus 570 may provide the pixel data and the event data to the image adjustment apparatus described with reference to FIGS. 1 through 4.

For example, the image processing apparatus according to an example embodiment includes the event-based image sensor 510, the frame-based image sensor 520, an adjuster 530, a clock generator 540, the beam splitter 550, and a lens 560.

Descriptions provided with reference to FIGS. 1 to 4 may be applied to the event-based image sensor 510, the frame-based image sensor 520, the adjuster 530, and the clock generator 540. Thus, a further detailed description will be omitted for conciseness and ease of description.

Figure 6:
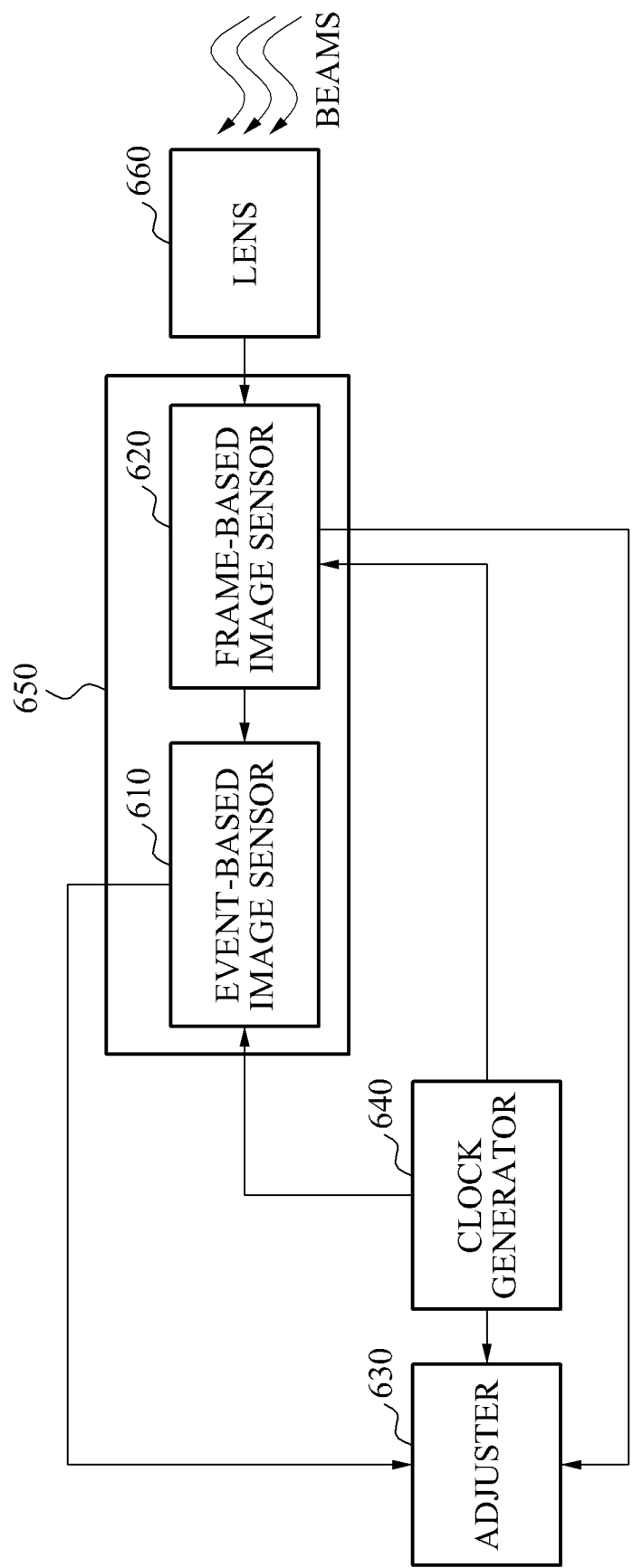
FIG. 6 is a diagram illustrating an example of an image sensing apparatus disposed in a manner to enable beams penetrating a frame-based image sensor to reach an event-based image sensor.

FIG. 6 is a diagram illustrating an example of an image sensing apparatus 650 disposed for beams penetrating a frame-based image sensor 620 to reach an event-based image sensor 610.

Referring to FIG. 6, the image sensing apparatus 650 includes the event-based image sensor 610 and the frame-based image sensor 620. In FIG. 6, the image sensing apparatus 650 does not include the beam splitter 550 of FIG. 5.

The image sensing apparatus 650 may use a common structure in which the event-based image sensor 610 and the frame-based image sensor 620 are sequentially disposed such that beams penetrating the frame-based image sensor 620 will subsequently reach the event-based image sensor 610 (in lieu of the beam splitter 550 of FIG. 5).

For example, the image sensing apparatus 650 may use a structure in which the event-based image sensor 610 and the frame-based image sensor 620 are laminated.

The image sensing apparatus 650 may be disposed for beams entering through a lens 660 to be input to the frame-based image sensor 620, and for the beams penetrating the frame-based image sensor 620 to reach the event-based image sensor 610, due to the laminated structure.

The image sensing apparatus 650 may be provided in a structure in which a first wafer and a second wafer are laminated. The first wafer may include the frame-based image sensor 620, and the second wafer may include the event-based image sensor 610.

The image sensing apparatus 650 may be manufactured by a process of bonding the first wafer and the second wafer. The first wafer may include a silicon material and be sufficiently thin to ensure penetration of beams entering through the lens 660.

While the beams entering through the lens 660 are penetrating the first wafer, at least a portion of the beams may be absorbed into the first wafer. For example, a silicon wafer with an energy band gap of approximately 1 electron volt (eV) may transmit beams of an infrared ray area more easily than beams of a visible ray area. The event-based image sensor 610 included in the second wafer may sense the beams penetrating the first wafer.

The image sensing apparatus 650 may provide pixel data and event data to the image adjustment apparatus described with reference to FIGS. 1 through 4.

For example, the image processing apparatus includes the event-based image sensor 610, the frame-based image sensor 620, an adjuster 630, a clock generator 640, and the lens 660.

Descriptions provided with reference to FIGS. 1 to 4 may be applied to the event-based image sensor 610, the frame-based image sensor 620, the adjuster 630, and the clock generator 640 and thus, a further detailed description will be omitted.

Figure 7A:
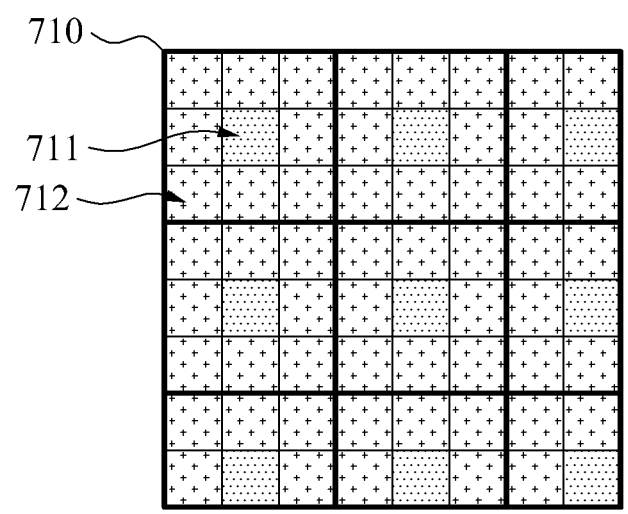
FIGS. 7A and 7B are diagrams illustrating an example of a hybrid image sensor.
Figure 7B:
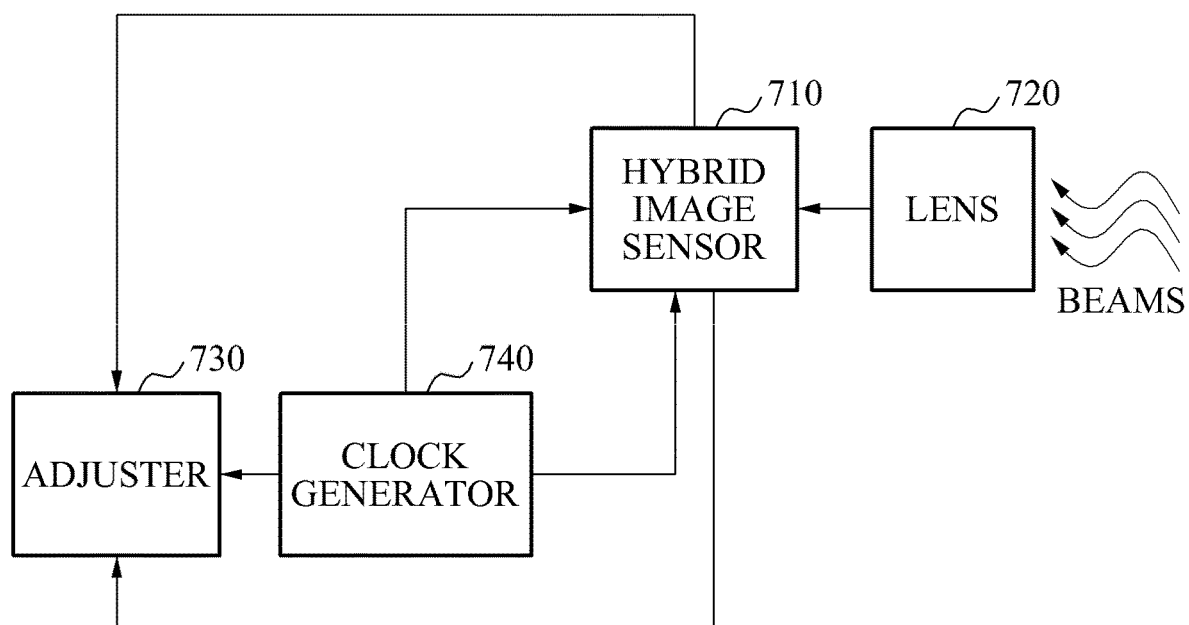

FIGS. 7A and 7B are diagrams illustrating an example of a hybrid image sensor 710.

Referring to FIG. 7A, a hybrid image sensor 710 includes a plurality of first image pixels 712 configured to time-synchronously capture an object, and at least one second image pixel 711 configured to time-asynchronously sense a motion event of the object.

Hereinafter, for descriptive convenience, a first image pixel is referred to as a frame-based image pixel, and a second image pixel is referred to as an event-based image pixel.

In the hybrid image sensor 710, at least one event-based image pixel may be disposed adjacent to at least one corresponding frame-based image pixel among a plurality of frame-based image pixels.

Alternatively, each of the at least one event-based image pixel may be disposed among a plurality of corresponding frame-based image pixels.

For example, a single event-based image pixel may correspond to eight frame-based image pixels. In this case, the event-based image pixel may be surrounded by the eight frame-based image pixels.

The hybrid image sensor 710 may be manufactured to be a single wafer including all of the event-based pixels and the frame-based image pixels.

Since the hybrid image sensor 710 uses the aforementioned hybrid structured-pixels, the hybrid image sensor 710 may not require an optical alignment or a beam absorption by a wafer.

Referring to FIG. 7B, the hybrid image sensor 710 may provide pixel data and event data to the image adjustment apparatus described with reference to FIGS. 1 to 4.

For example, the image processing apparatus according to an example embodiment includes the hybrid image sensor 710, an adjuster 730, a clock generator 740, and a lens 720.

Descriptions provided with reference to FIGS. 1 to 4 may be applied to the event-based image pixels and the frame-based image pixels included in the hybrid image sensor 710, the adjuster 730, and the clock generator 740. Thus, a further detailed description will be omitted for conciseness and ease of description.

Figure 8:
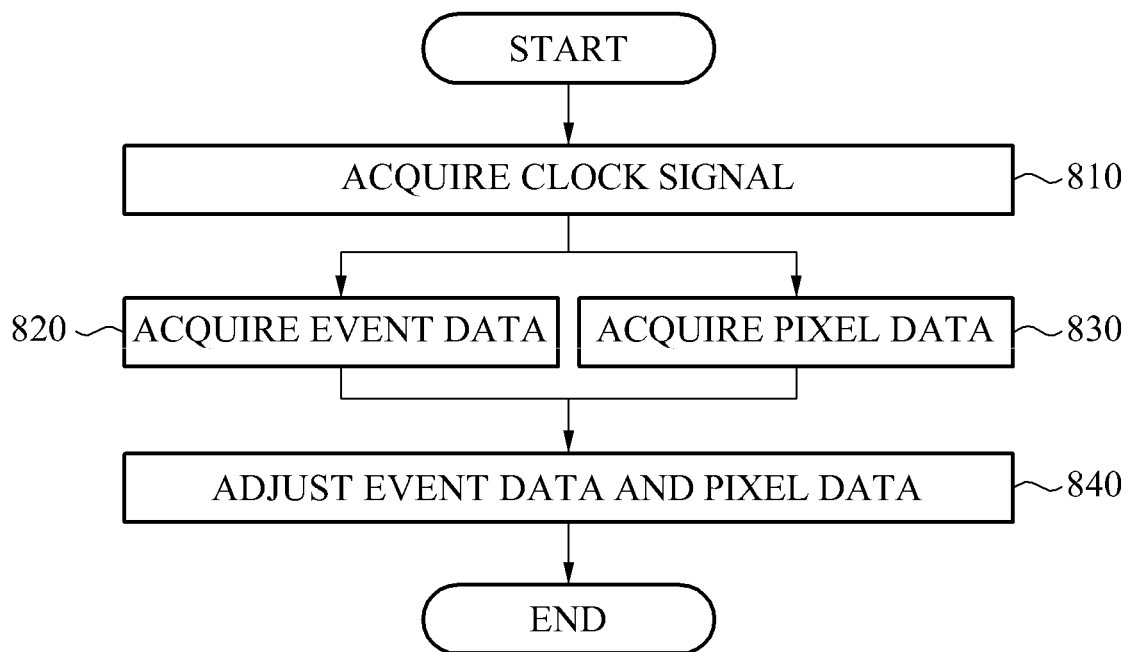
FIG. 8 is a flowchart illustrating an example of an image adjustment method.

FIG. 8 is a flowchart illustrating an example of an image adjustment method.

Referring to FIG. 8, an image adjustment apparatus according to an example embodiment acquires a clock signal in operation 810. In operation 820, the image adjustment apparatus acquires event data occurring asynchronously to the clock signal, in response to sensing a predetermined event.

In operation 830, the image adjustment apparatus acquires pixel data occurring synchronously to the clock signal based on a predetermined number of frames per second. In operation 840, the image adjustment apparatus adjusts the event data and the pixel data based on the clock signal.

Descriptions provided with reference to FIGS. 1 to 7B may be applied to operations of FIG. 8. Thus, a further detailed description will be omitted for conciseness and ease of description.

The method according to the above-described embodiments may be recorded in non-transitory computer-readable media including program instructions to implement various operations embodied by a computer. The media may also include, alone or in combination with the program instructions, data files, data structures, etc. Examples of non-transitory computer-readable media include magnetic media such as hard disks, floppy disks, and magnetic tape, optical media such as CD ROM discs and DVDs, magneto-optical media such as optical discs, and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the exemplary embodiments, the scope of which is defined by the claims and their equivalents.

What is claimed is:

1. An image adjustment apparatus comprising:
    a receiver configured to receive an input image of an object captured time-synchronously and an first event data related to a first motion event of the object captured time-asynchronously; and
    an adjuster configured to adjust space information of the input image and space information of the first event data,
    wherein the input image and the first event data are received during a same frame period, and
    wherein the first event data includes at least one of an indicator to indicate a type of the first motion event, an address at which the first motion event is sensed, and an event timing at which the first motion event is sensed.

2. The image adjustment apparatus of claim 1, wherein the receiver is configured to receive a second event data related to a second motion event of the object captured time-asynchronously,
    wherein the adjuster is configured to adjust the space information of the input image and space information of the second event data, and wherein the input image and the second event data are received during the same frame period.

3. The image adjustment apparatus of claim 1, wherein the input image has a first resolution and the first event data has a second resolution less than the first resolution.

4. The image adjustment apparatus of claim 3, wherein the first event data includes a plurality of ON events.

5. The image adjustment apparatus of claim 2, wherein the second event data includes a plurality of OFF events.

6. The image adjustment apparatus of claim 4, wherein the receiver is configured to receive the input image synchronized with a clock signal.

7. The image adjustment apparatus of claim 4, wherein the receiver is configured to receive five event signals including the first and second event data during the same frame period.

8. The image adjustment apparatus of claim 4, wherein the receiver is configured to receive the input image from a first sensor and receive the first event data from the first sensor.

9. The image adjustment apparatus of claim 4, wherein the receiver is configured to receive the input image from a first sensor and receive the first event data from a second sensor spaced apart from the first sensor.

10. The image adjustment apparatus of claim 8, wherein the receiver is configured to receive N event data during a first frame period and receive M event data during a second frame period different from the first frame period,
wherein N and M are integers, and
wherein N is different from M.

11. An image adjustment apparatus comprising:
a receiver configured to:
receive an first input image of an object captured time-synchronously during a first frame period;
receive N event data of the object captured time-asynchronously during the first frame period;
receive an second input image of the object captured time-synchronously during a second frame period different from the first frame period; and
receive M event data of the object captured time-asynchronously during the second frame period,
wherein the N event data include a first event data,
wherein the first input image has a first resolution and the first event data has a second resolution less than the first resolution,
wherein the first event data includes an indicator to indicate a type of an event,
wherein N and M are integers,
wherein N is different from M,
wherein the N event data and the M event data are related to movements of the object, and
wherein the first event data includes an address at which the event is sensed, and an event timing at which the event is sensed.

12. The image adjustment apparatus of claim 11, wherein the N event data include a plurality of ON events.

13. The image adjustment apparatus of claim 12, wherein the receiver is configured to receive the first input image from a first sensor and receive the first event data from the first sensor.

14. The image adjustment apparatus of claim 12, wherein the receiver is configured to receive the first input image from a first sensor and receive the first event data from a second sensor spaced apart from the first sensor.

15. The image adjustment apparatus of claim 12, further comprising:
an adjuster configured to adjust space information of the first input image and space information of the first event data.

16. The image adjustment apparatus of claim 12, further comprising:
an adjuster configured to adjust space information of an input image and space information of a second event data.

17. The image adjustment apparatus of claim 13, further comprising:
an adjuster configured to adjust space information of an input image and space information of a second event data.

18. The image adjustment apparatus of claim 11, further comprising an adjuster configured to adjust space information of an input image and space information of a second event data based on a clock signal.

* * * * *